(12) United States Patent
Rigney et al.

(10) Patent No.: US 8,451,697 B1
(45) Date of Patent: May 28, 2013

(54) DISK DRIVE CENTERING DEMODULATION WINDOWS ON SPIRAL TRACKS DURING A SEEK OPERATION

(75) Inventors: Brian P. Rigney, Louisville, CO (US); Siri S. Weerasooriya, Campbell, CA (US); Steven C. Smith, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 192 days.

(21) Appl. No.: 13/113,941

(22) Filed: May 23, 2011

(51) Int. Cl.
*G11B 7/00* (2006.01)
(52) U.S. Cl.
USPC .................................. 369/44.28; 369/44.29
(58) Field of Classification Search
None
See application file for complete search history.

(56) References Cited

U.S. PATENT DOCUMENTS

| | | | |
|---|---|---|---|
| 5,668,679 A | 9/1997 | Swearingen et al. |
| 5,754,352 A | 5/1998 | Behrens et al. |
| 6,005,727 A | 12/1999 | Behrens et al. |
| 6,021,012 A | 2/2000 | Bang |
| 6,091,564 A | 7/2000 | Codilian et al. |
| 6,191,906 B1 | 2/2001 | Buch |
| 6,292,318 B1 | 9/2001 | Hayashi |
| 6,304,407 B1 | 10/2001 | Baker et al. |
| 6,411,453 B1 | 6/2002 | Chainer et al. |
| 6,507,450 B1 | 1/2003 | Elliott |
| 6,519,107 B1 | 2/2003 | Ehrlich et al. |
| 6,587,293 B1 | 7/2003 | Ding et al. |
| 6,704,156 B1 | 3/2004 | Baker et al. |
| 6,738,205 B1 | 5/2004 | Moran et al. |
| 6,920,004 B1 | 7/2005 | Codilian et al. |
| 6,924,960 B1 | 8/2005 | Melkote et al. |
| 6,937,420 B1 | 8/2005 | McNab et al. |
| 6,943,978 B1 | 9/2005 | Lee |
| 6,967,799 B1 | 11/2005 | Lee |
| 6,985,316 B1 | 1/2006 | Liikanen et al. |
| 6,987,636 B1 | 1/2006 | Chue et al. |
| 6,989,954 B1 | 1/2006 | Lee et al. |
| 7,002,761 B1 | 2/2006 | Sutardja et al. |
| 7,019,937 B1 | 3/2006 | Liikanen et al. |
| 7,088,533 B1 | 8/2006 | Shepherd et al. |
| 7,136,253 B1 | 11/2006 | Liikanen et al. |
| 7,145,744 B1 | 12/2006 | Clawson et al. |
| 7,212,364 B1 | 5/2007 | Lee |
| 7,230,786 B1 | 6/2007 | Ray et al. |
| 7,248,426 B1 | 7/2007 | Weerasooriya et al. |
| 7,333,280 B1 | 2/2008 | Lifchits et al. |
| 7,382,564 B1 | 6/2008 | Everett et al. |
| 7,391,584 B1 | 6/2008 | Sheh et al. |
| 7,411,758 B1 | 8/2008 | Cheung et al. |
| 7,522,370 B1 | 4/2009 | Sutardja |
| 7,551,387 B2 | 6/2009 | Sun et al. |
| 7,561,361 B1 | 7/2009 | Rutherford |
| 7,639,445 B2 | 12/2009 | Matsunaga et al. |
| 7,639,446 B2 | 12/2009 | Mizukoshi et al. |
| 7,656,604 B1 | 2/2010 | Liang et al. |
| 7,675,705 B2 | 3/2010 | Mizukoshi et al. |

(Continued)

*Primary Examiner* — Paul Huber

(57) ABSTRACT

A disk drive is disclosed comprising a head actuated over a disk comprising a plurality of spiral tracks. During a seek operation, a demodulation window is opened in response to a window offset during a first revolution of the disk, wherein the demodulation window corresponds to the head approaching a spiral track. A window position error signal (PES) is generated representing a difference between a target framing of the demodulation window around the spiral track crossing and a detected framing of the demodulation window around the spiral track crossing. The window offset is adjusted in response to the first window PES, and the demodulation window is opened in response to the adjusted window offset during a second revolution of the disk.

16 Claims, 15 Drawing Sheets

U.S. PATENT DOCUMENTS

| | | |
|---|---|---|
| 7,715,143 B2 | 5/2010 | Bliss et al. |
| 7,733,588 B1 | 6/2010 | Ying |
| 7,737,793 B1 | 6/2010 | Ying et al. |
| 7,751,144 B1 | 7/2010 | Sutardja |
| 7,852,598 B1 | 12/2010 | Sutardja |
| 7,881,004 B2 | 2/2011 | Kumbla et al. |
| 7,881,005 B1 | 2/2011 | Cheung et al. |
| 2006/0171059 A1 | 8/2006 | Chan et al. |
| 2007/0070538 A1 | 3/2007 | Lau et al. |
| 2007/0076314 A1 | 4/2007 | Rigney |
| 2007/0211367 A1 | 9/2007 | Lau et al. |

DISK DRIVE CENTERING DEMODULATION WINDOWS ON SPIRAL TRACKS DURING A SEEK OPERATION

BACKGROUND

When manufacturing a disk drive, concentric servo sectors $2_0$-$2_N$ are written to a disk 4 which define a plurality of radially-spaced, concentric data tracks 6 as shown in the prior art disk format of FIG. 1. Each data track 6 is partitioned into a plurality of data sectors wherein the concentric servo sectors $2_0$-$2_N$ are considered "embedded" in the data sectors. Each servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target track during a seek operation, and the servo bursts 14 are processed to maintain the head over a centerline of the target track while writing or reading data during a tracking operation.

In the past, external servo writers have been used to write the concentric servo sectors $2_0$-$2_N$ to the disk surface during manufacturing. External servo writers employ extremely accurate head positioning mechanics, such as a laser interferometer, to ensure the concentric servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the concentric servo sectors independent of an external servo writer. For example, U.S. Pat. No. 5,668,679 teaches a disk drive which performs a self-servo writing operation by writing a plurality of spiral servo tracks to the disk which are then processed to write the concentric servo sectors along a circular path. Each spiral servo track is written to the disk as a high frequency signal (with missing bits), wherein the position error signal (PES) for tracking is generated relative to time shifts in the detected location of the spiral servo tracks. The read signal is rectified and low pass filtered to generate a triangular envelope signal representing a spiral servo track crossing, wherein the location of the spiral servo track is detected by detecting a peak in the triangular envelope signal relative to a clock synchronized to the rotation of the disk.

DETAILED DESCRIPTION OF EMBODIMENTS OF THE INVENTION

In an embodiment of the present invention, a disk drive comprises a head actuated over a disk including a plurality of spiral tracks, wherein each spiral track comprises a high frequency signal interrupted at a predetermined interval by a sync mark. The head is used to read the spiral tracks to generate a read signal representing spiral track crossings, wherein the spiral track crossings are processed to seek the head over a plurality of concentric tracks defined by the spiral tracks. A demodulation window is opened in response to a window offset during a first revolution of the disk, wherein the demodulation window corresponds to the head approaching a spiral track. The head is used to read the spiral track to generate a first spiral track crossing, and a window position error signal (PES) is generated representing a difference between a target framing of the demodulation window around the first spiral track crossing and a detected framing of the demodulation window around the first spiral track crossing. The window offset is adjusted in response to the window PES, and the demodulation window is opened in response to the adjusted window offset during a second revolution of the disk.

Figure 2B:
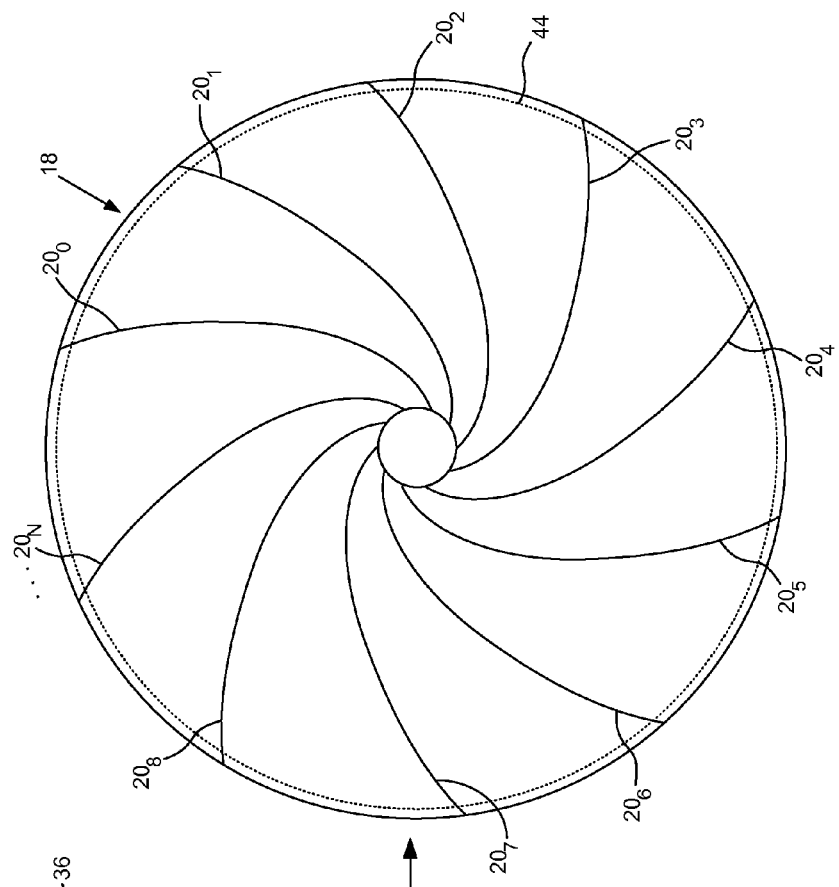
FIGS. 2A and 2B illustrate an embodiment of the present invention wherein an external spiral servo writer is used to write a plurality of spiral tracks to the disk for use in writing product servo sectors to the disk.
Figure 2A:
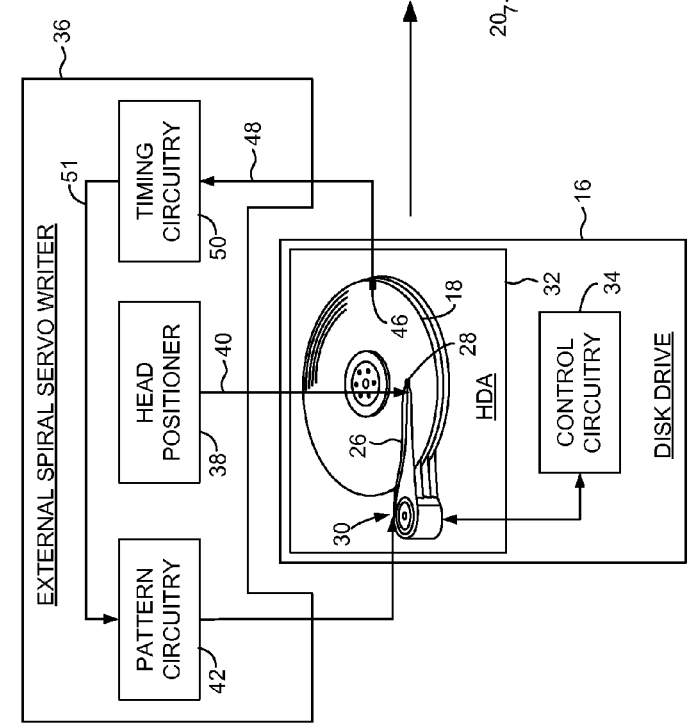

The spiral tracks may comprise any suitable pattern and may be written to the disk using any suitable technique, such as using an external writer for writing the spiral tracks to the disk, or stamping the spiral tracks on the disk using magnetic printing techniques. FIGS. 2A and 2B show an embodiment wherein a plurality of spiral tracks $20_0$-$20_N$ are written to a disk 18 of a disk drive 16 using an external spiral servo writer 36. The disk drive 16 comprises control circuitry 34 and a head disk assembly (HDA) 32 comprising the disk 18, an actuator arm 26, a head 28 coupled to a distal end of the actuator arm 26, and a voice coil motor 30 for rotating the actuator arm 26 about a pivot to position the head 28 radially over the disk 18. A write clock is synchronized to the rotation of the disk 18, and the plurality of spiral tracks $20_0$-$20_N$ are written on the disk 18 at a predetermined circular location determined from the write clock. Each spiral track $20_i$ comprises a high frequency signal 22 (FIG. 4B) interrupted at a predetermined interval by a sync mark 24.

The external spiral servo writer 36 comprises a head positioner 38 for actuating a head positioning pin 40 using sensitive positioning circuitry, such as a laser interferometer. Pattern circuitry 42 generates the data sequence written to the disk 18 for the spiral tracks $20_0$-$20_N$. The external spiral servo writer 36 inserts a clock head 46 into the HDA 32 for writing a clock track 44 (FIG. 2B) at an outer diameter of the disk 18. The clock head 46 then reads the clock track 44 to generate a clock signal 48 processed by timing recovery circuitry 50 to synchronize the write clock 51 for writing the spiral tracks $20_0$-$20_N$ to the disk 18. The timing recovery circuitry 50 enables the pattern circuitry 42 at the appropriate time relative to the write clock 51 so that the spiral tracks $20_0$-$20_N$ are written at the appropriate circular location. The timing recovery circuitry 50 also enables the pattern circuitry 42 relative to the write clock 51 to write the sync marks 24 (FIG. 4B) within the spiral tracks $20_0$-$20_N$ at the same circular location from the outer diameter to the inner diameter of the disk 18. As described below with reference to FIG. 5, the constant interval between sync marks 24 (independent of the radial location of the head 28) enables a servo write clock to maintain synchronization while writing the product servo sectors to the disk.

Figure 3:
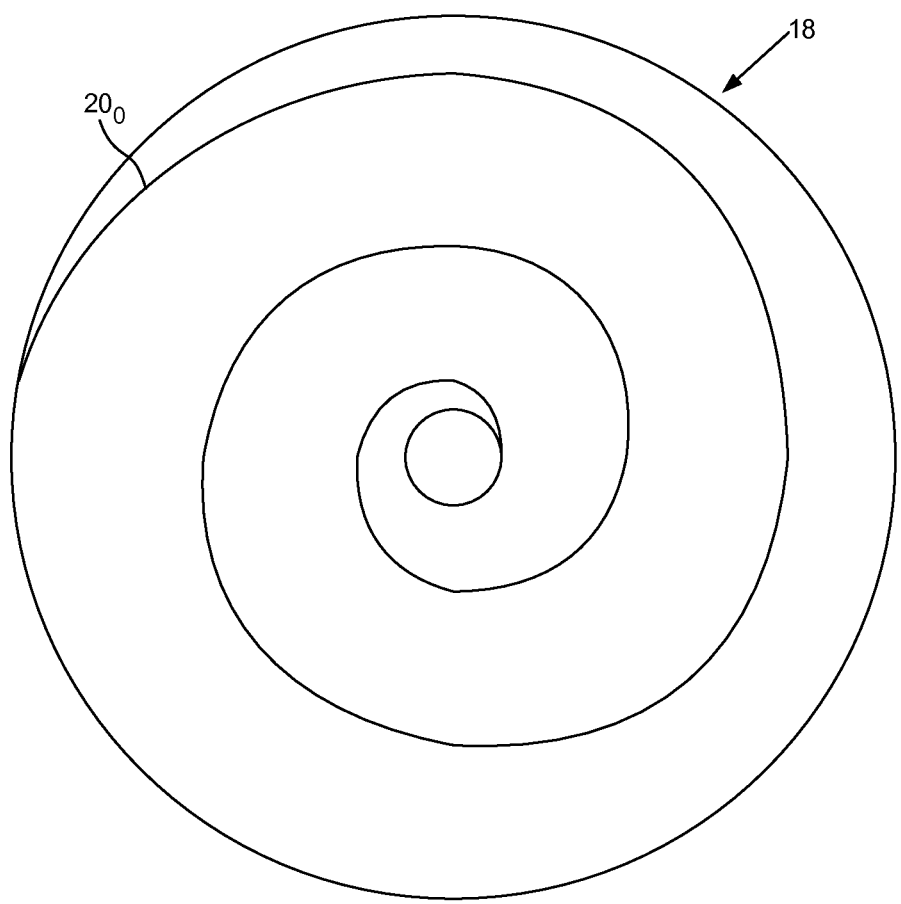
FIG. 3 illustrates an embodiment of the present invention wherein each spiral track is written over multiple revolutions of the disk.

In the embodiment of FIG. 2B, each spiral track $20_i$ is written over a partial revolution of the disk 18. In an alternative embodiment, each spiral track $20_i$ is written over one or more revolutions of the disk 18. FIG. 3 shows an embodiment wherein each spiral track $20_i$ is written over multiple revolutions of the disk 18. In the embodiment of FIG. 2A, the entire disk drive 16 is shown as being inserted into the external spiral servo writer 36. In an alternative embodiment, only the HDA 32 is inserted into the external spiral servo writer 36. In yet another embodiment, an external media writer is used to write the spiral tracks $20_0$-$20_N$ to a number of disks 18, and one or more of the disks 18 are then inserted into an HDA 32.

Referring again to the embodiment of FIG. 2A, after the external spiral servo writer 36 writes the spiral tracks $20_0$-$20_N$ to the disk 18, the head positioning pin 40 and clock head 46 are removed from the HDA 32 and the product servo sectors are written to the disk 18. In one embodiment, the control circuitry 34 within the disk drive 16 is used to process the spiral tracks $20_0$-$20_N$ in order to write the product servo sectors to the disk 18. In an alternative embodiment described below with reference to FIGS. 10 and 11, an external product servo writer is used to process the spiral tracks $20_0$-$20_N$ in order to write the product servo sectors to the disk 18 during a "fill operation".

Figure 4A:
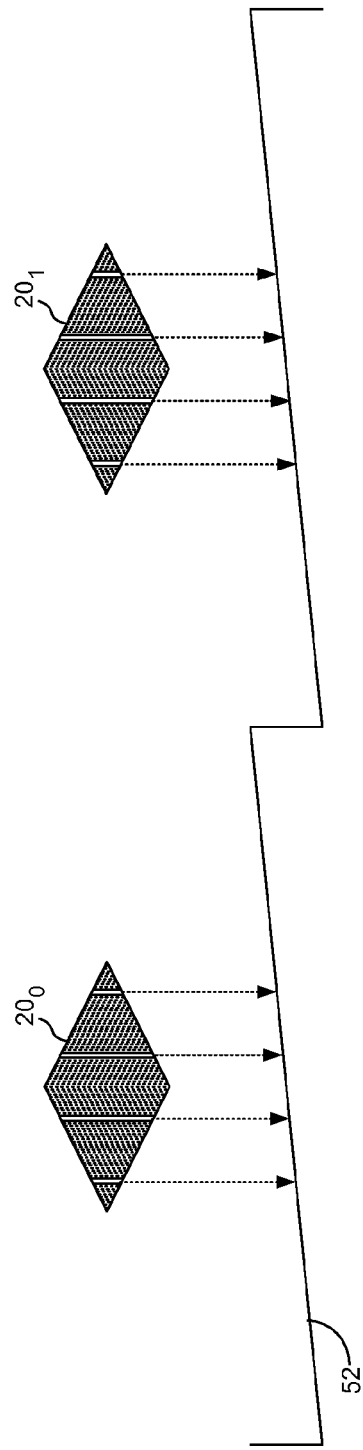
FIG. 4A shows an embodiment of the present invention wherein a servo write clock is synchronized by clocking a modulo-N counter relative to when the sync marks in the spiral tracks are detected.
Figure 4B:
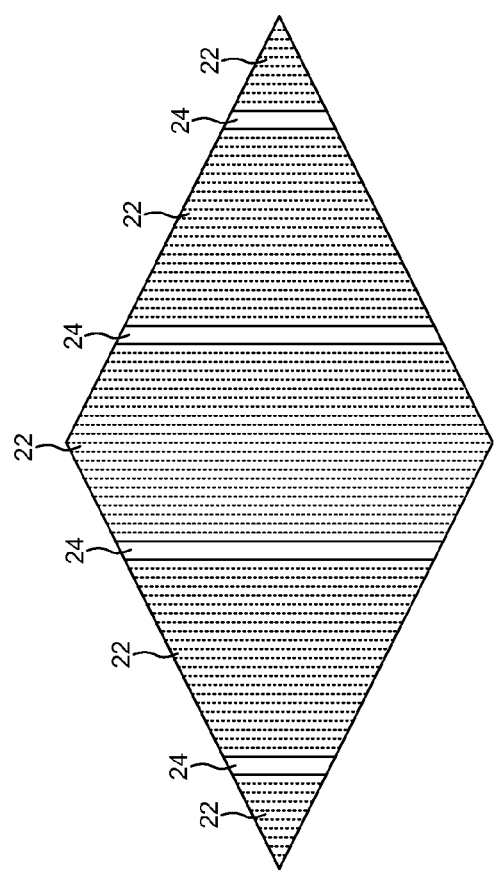
FIG. 4B shows an eye pattern generated by reading the spiral track, including the sync marks in the spiral track.

FIG. 4B illustrates an "eye" pattern in the read signal that is generated when the head 28 crosses over a spiral track 20. The read signal representing the spiral track crossing comprises high frequency transitions 22 interrupted by sync marks 24 at a predetermined interval. When the head 28 moves in the radial direction, the eye pattern will shift (left or right) while the sync marks 24 remain fixed (ideally). The shift in the eye pattern (detected from the high frequency signal 22) relative to the sync marks 24 provides the off-track information (spiral position error signal (PES)) for servoing the head 28.

FIG. 4A shows an embodiment of the present invention wherein a saw-tooth waveform 52 is generated by clocking a modulo-N counter with the servo write clock, wherein the frequency of the servo write clock is adjusted until the sync marks 24 in the spiral tracks $20_0$-$20_N$ are detected at a target modulo-N count value. The servo write clock may be generated using any suitable circuitry, such as a phase locked loop (PLL). As each sync mark 24 in the spiral tracks $20_0$-$20_N$ is detected, the value of the modulo-N counter represents the phase error for adjusting the PLL.

Figure 1:
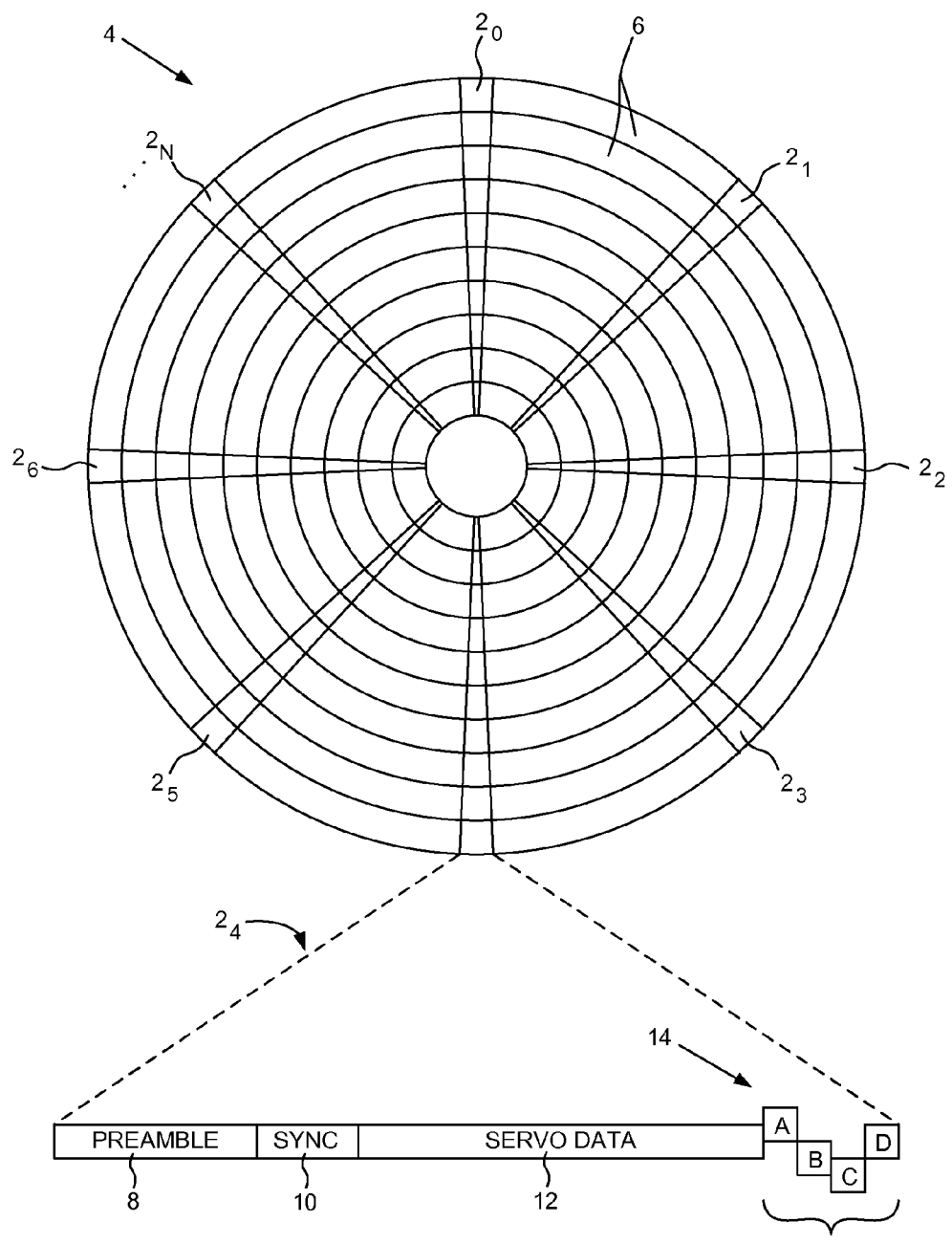
FIG. 1 shows a prior art disk format comprising a plurality of radially spaced, concentric tracks defined by a plurality of product servo sectors.

The sync marks 24 in the spiral tracks $20_0$-$20_N$ may comprise any suitable pattern, and in one embodiment, a pattern that is substantially shorter than the sync mark 10 in the conventional product servo sectors 2 of FIG. 1. A shorter sync mark 24 allows the spiral tracks $20_0$-$20_N$ to be written to the disk 18 using a steeper slope (by moving the head faster from the outer diameter to the inner diameter of the disk 18) which reduces the time required to write each spiral track $20_0$-$20_N$.

In one embodiment, the servo write clock is further synchronized by generating a timing recovery measurement from the high frequency signal 22 between the sync marks 24 in the spiral tracks $20_0$-$20_N$. Synchronizing the servo write clock to the high frequency signal 22 helps maintain proper radial alignment (phase coherency) of the Gray coded track addresses in the product servo sectors. The timing recovery measurement may be generated in any suitable manner. In one embodiment, the servo write clock is used to sample the high frequency signal 22 and the signal sample values are processed to generate the timing recovery measurement. The timing recovery measurement adjusts the phase of the servo write clock (PLL) so that the high frequency signal 22 is sampled synchronously. In this manner, the sync marks 24 provide a coarse timing recovery measurement and the high frequency signal 22 provides a fine timing recovery measurement for maintaining synchronization of the servo write clock.

Figure 5:
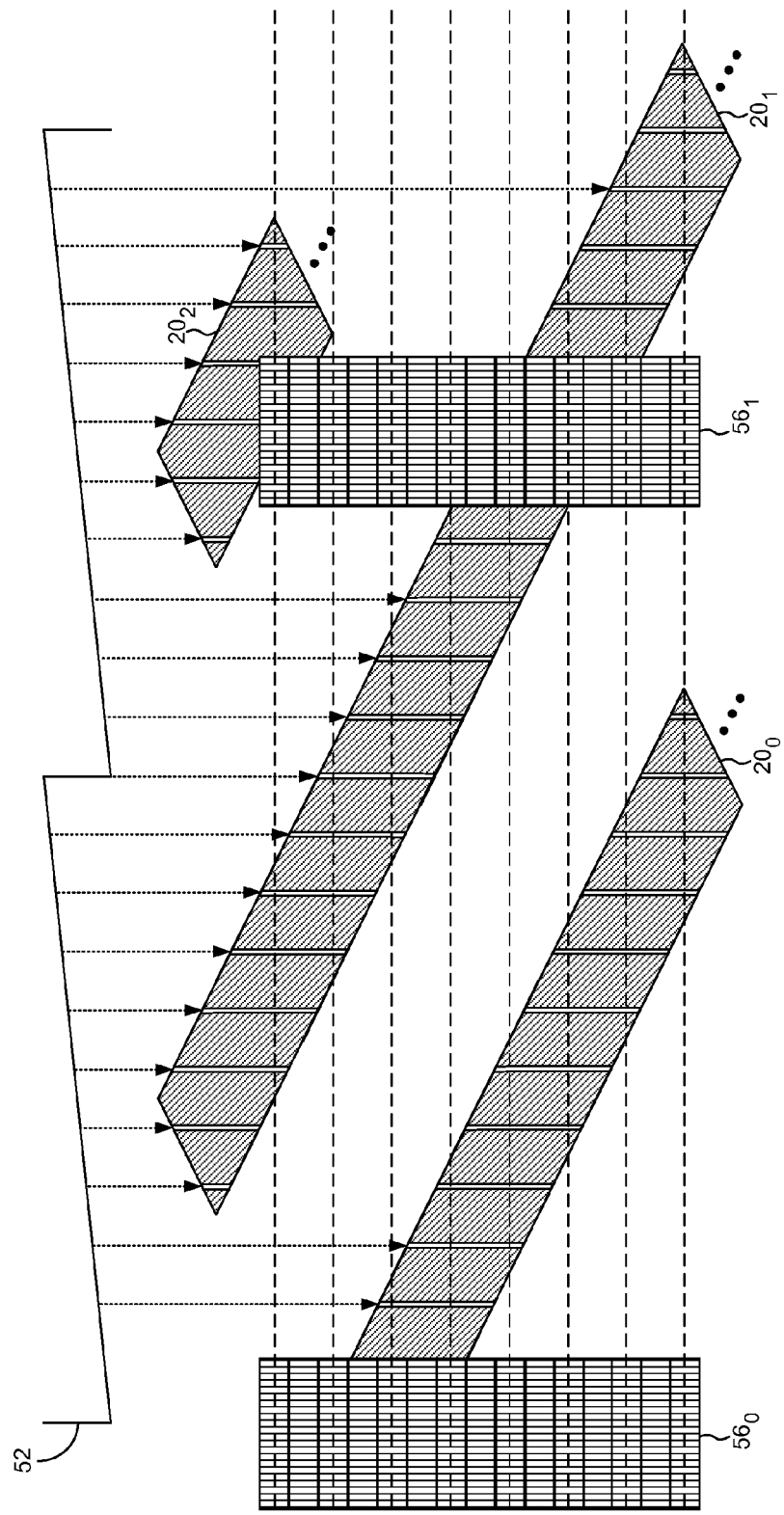
FIG. 5 illustrates writing of product servo sectors using a servo write clock generated from reading the spiral tracks.

FIG. 5 illustrates how the product servo sectors $56_0$-$56_N$ are written to the disk 18 after synchronizing the servo write clock in response to at least the sync marks 24 in the spiral tracks $20_0$-$20_N$. In the embodiment of FIG. 5, the dashed lines represent the centerlines of the data tracks. The sync marks in the spiral tracks $20_0$-$20_N$ are written so that there is a shift of two sync marks 24 in the eye pattern (FIG. 4B) between data tracks. In an alternative embodiment, the sync marks 24 in the spiral tracks $20_0$-$20_N$ are written so that there is a shift of N sync marks in the eye pattern between data tracks. In the embodiment of FIG. 5, each spiral track $20_0$-$20_N$ is wider than a data track, however, in an alternative embodiment the width of each spiral track $20_0$-$20_N$ is less than or proximate the width of a data track.

The spiral PES for maintaining the head 28 along a servo track (tracking) may be generated from the spiral tracks $20_0$-$20_N$ in any suitable manner. In one embodiment, the PES is generated by detecting the eye pattern in FIG. 4B using an envelope detector and detecting a shift in the envelope relative to the sync marks 24. In one embodiment, the envelope is detected by integrating the high frequency signal 22 and detecting a shift in the resulting ramp signal. In an alternative embodiment, the high frequency signal 22 between the sync marks 24 in the spiral tracks are demodulated as servo bursts and the PES generated by comparing the servo bursts in a similar manner as the servo bursts 14 in the product servo sectors (FIG. 1).

Once the head 28 is tracking on a servo track, the product servo sectors $56_0$-$56_N$ are written to the disk using the servo write clock. Write circuitry is enabled when the modulo-N counter reaches a predetermined value, wherein the servo write clock clocks the write circuitry to write the product servo sector 56 to the disk. The spiral tracks $20_0$-$20_N$ on the disk are processed in an interleaved manner to account for the product servo sectors $56_0$-$56_N$ overwriting a spiral track. For example, when writing the product servo sectors $56_1$ to the disk, spiral track $20_0$ is processed initially to generate the spiral PES tracking error and the servo write clock timing recovery measurement. When the product servo sectors $56_1$ begin to overwrite spiral track $20_1$, spiral track $20_o$ is processed to generate the spiral PES tracking error and the servo write clock timing recovery measurement.

Figure 6A:
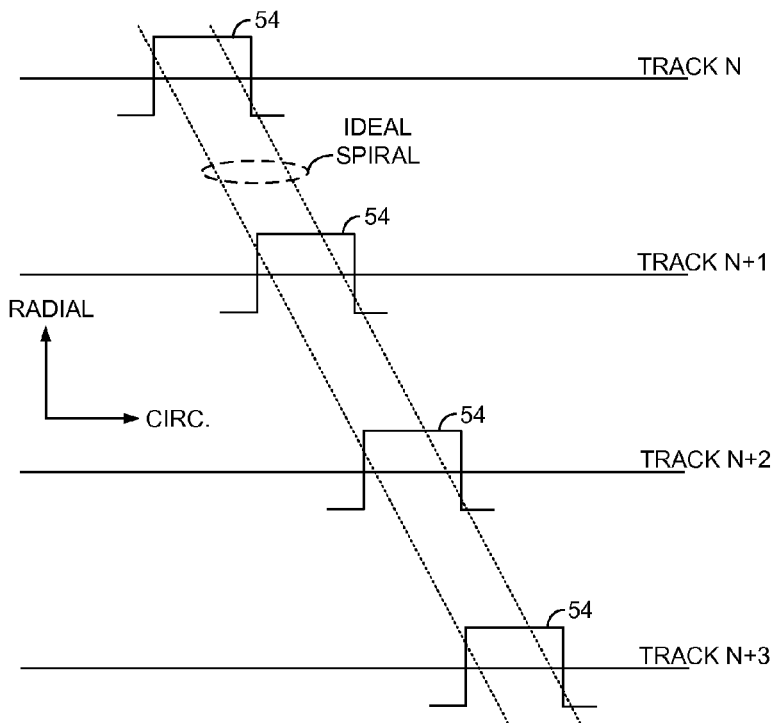
FIG. 6A illustrates a technique for adjusting a demodulation window in order to follow the trajectory of an ideal spiral track crossing as the head moves radially over the disk.
Figure 6B:
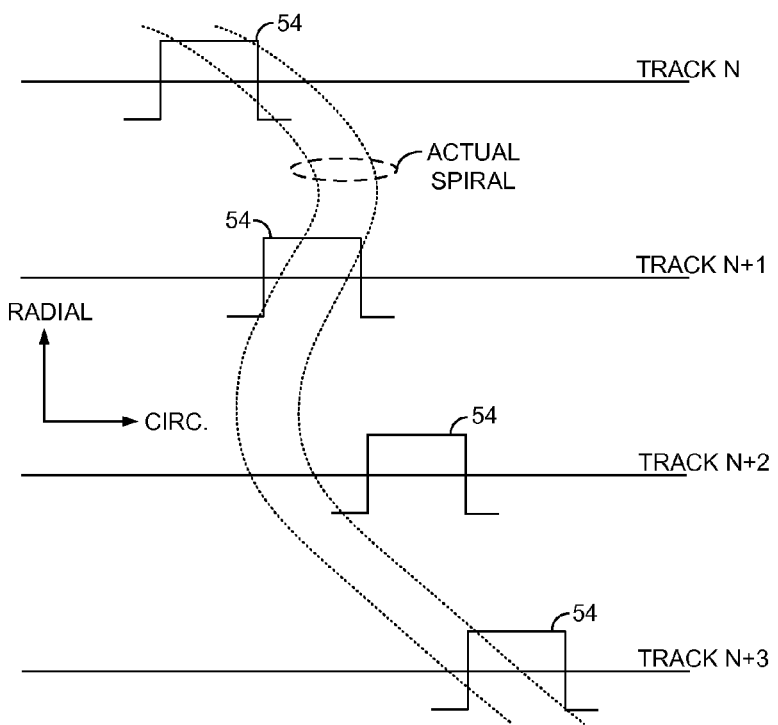
FIG. 6B illustrates how imperfections in an actual spiral track crossing induces error in the demodulation window.

In the embodiments of the present invention, a demodulation window 54 (FIG. 6A) is opened as the head approaches each spiral track. This helps ensure the resulting read signal represents the spiral track crossing and reduces the amount of noise in the read signal due to other aberrations on the disk (including previously written product servo sectors). As the head is moved radially over the disk, the demodulation window 54 is adjusted based on the expected location of an ideal spiral track as illustrated in FIG. 6A. However, imperfections in the actual spiral tracks will induce an error in the demodulation window 54 as illustrated in FIG. 6B such that part or all of a spiral track crossing may occur outside of the demodulation window 54.

Figure 7A:
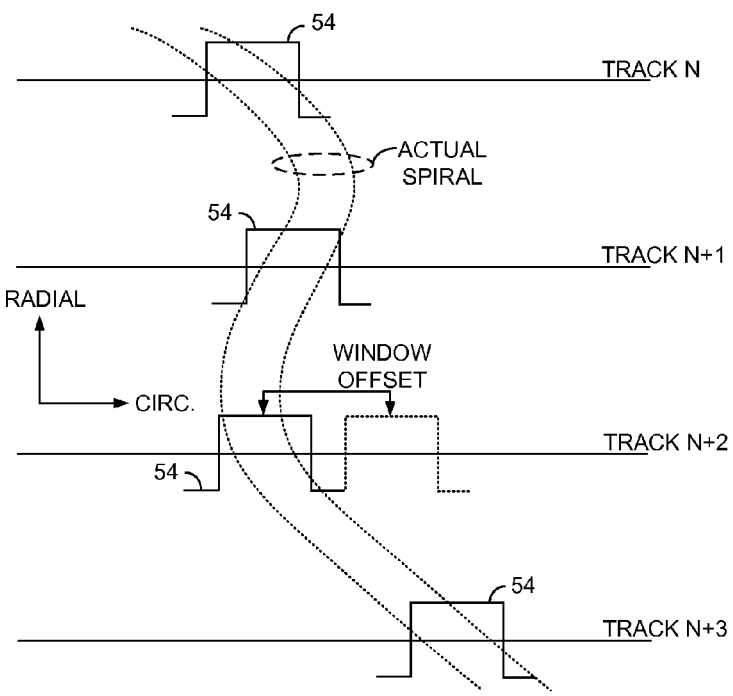
FIG. 7A illustrates an embodiment of the present invention wherein the demodulation window is adjusted in a manner that tracks the imperfections in the actual spiral track crossing.
Figure 7B:
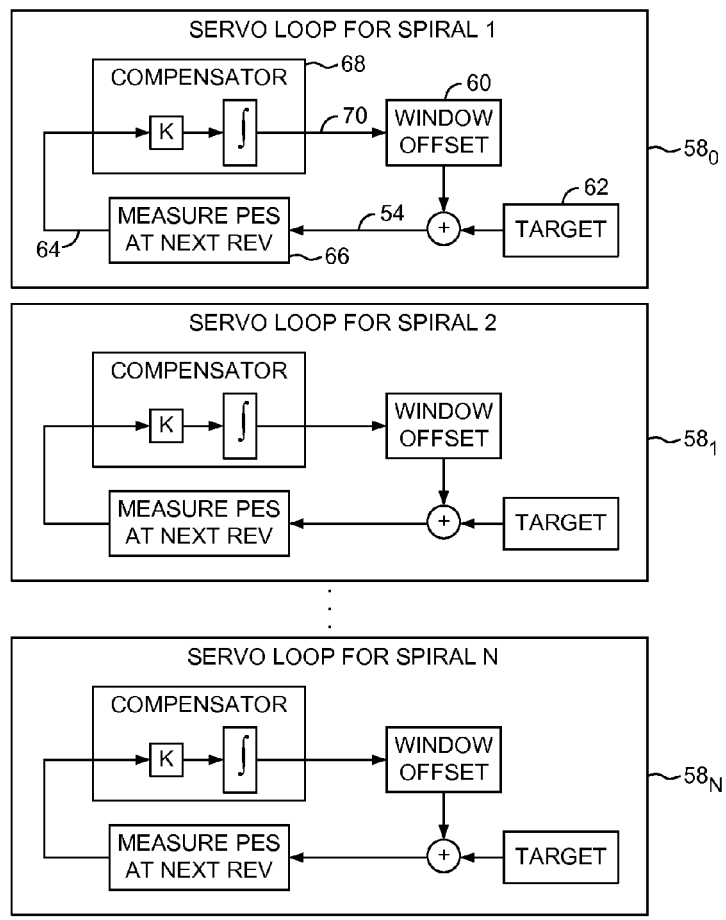
FIG. 7B illustrates an embodiment of the present invention wherein N servo loops are employed to adjust the N demodulation windows corresponding to N spiral track crossings.

FIG. 7A illustrates an embodiment of the present invention wherein the demodulation window 54 is adjusted in order to track the imperfections in the actual spiral track crossing. In an embodiment shown in FIG. 7B, N servo loops $58_0$-$58_N$ are employed to adjust the N demodulation windows corresponding to N spiral track crossings so that the unique imperfections in each spiral track is accounted for. In the embodiment of FIG. 7B, a window offset 60 adjusts a target window location 62 to generate the demodulation window 54 (as illustrated in FIG. 7A), wherein in one embodiment the target window location 62 corresponds to the location of an ideal spiral track (FIG. 6A). The adjusted demodulation window 54 is then opened during a next disk revolution and a window position error signal (PES) 64 is generated 66 representing a framing error relative to the spiral track crossing. A servo compensator 68 filters the window PES 64 to generate a control signal 70 for adjusting the window offset 60 in a direction that reduces the window PES 64. This process is repeated for each revolution of the disk, and in one embodiment, the process is repeated while seeking the head radially over the disk. In this manner, the demodulation window 54 tracks the imperfections in the spiral track which can vary over the radius of the disk as illustrated in FIG. 7A.

Figure 8A:
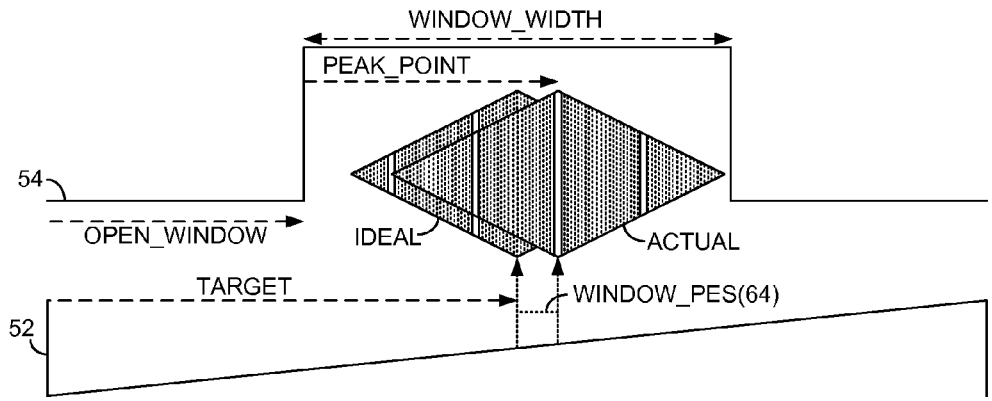
FIGS. 8A and 8B illustrate an embodiment of the present invention wherein a window position error signal (PES) is generated relative to a spiral track crossing, and used to adjust the window offset for use in the next disk revolution.
Figure 8B:
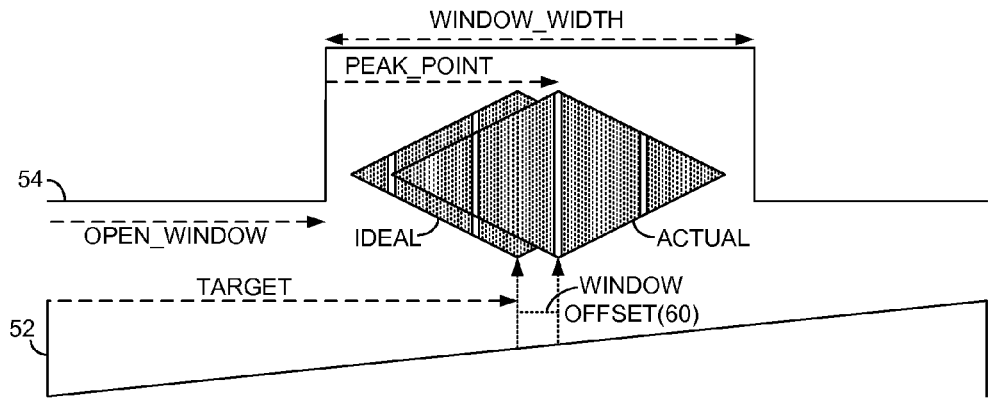

The window PES 64 in the embodiment of FIG. 7B may be generated in any suitable manner, and in one embodiment, the window PES 64 is generated independent of the spiral PES so that adjusting the demodulation window 54 does not affect the spiral PES. An example of this embodiment is shown in FIG. 8A wherein the spiral PES is generated relative to a fixed reference of the modulo-N counter (the saw-tooth waveform 52), such as when the modulo-N counter wraps. The spiral PES is generated as a difference between a target location on the saw-tooth waveform (e.g., middle) and the sum of when the demodulation window is opened and the detected peak point in the spiral track crossing relative to the start of the demodulation window. The window PES is generated as the difference between half the demodulation window width and the detected peak point in the spiral track crossing. FIG. 8B illustrates an embodiment wherein the window offset 60 is adjusted by the window PES 64 (FIG. 8A) so that the demodulation window 54 is centered about the spiral track crossing. In the example shown, the window offset 60 adjusts the demodulation window 54 by increasing when the window is opened, with a corresponding decrease in the detected peak point, thereby adjusting the demodulation window 54 without affecting the spiral PES.

Figure 9A:
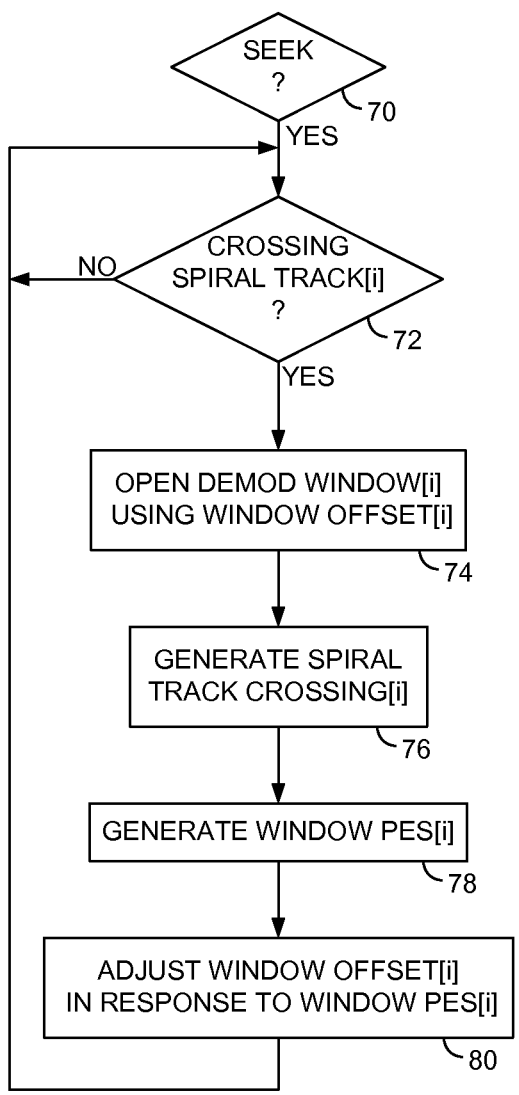
FIG. 9A is a flow diagram according to an embodiment of the present invention wherein a window PES is generated at each spiral track crossing and used to adjust the window offset for the corresponding demodulation window.

FIG. 9A is a flow diagram according to an embodiment of the present invention wherein during a seek operation (step 70) when the head approaches a spiral track[i] (step 72), a corresponding demodulation window[i] is opened in response to a window offset[i] during a first revolution of the disk (step 74). The head is used to read the spiral track[i] to generate a first spiral track crossing[i] (step 76), and a window PES[i] is generated representing a difference between a target framing of the demodulation window[i] around the first spiral track crossing[i] and a detected framing of the demodulation window[i] around the first spiral track crossing[i] (step 78). The window offset[i] is adjusted in response to the window PES[i] (step 80), and the demodulation window[i] is opened (step 74) in response to the adjusted window offset[i] during a second revolution of the disk when the head again approaches the spiral track[i] (step 72). The flow diagram of FIG. 9A is executed as the head crosses over each spiral track[i] (where i=0-N).

Figure 9B:
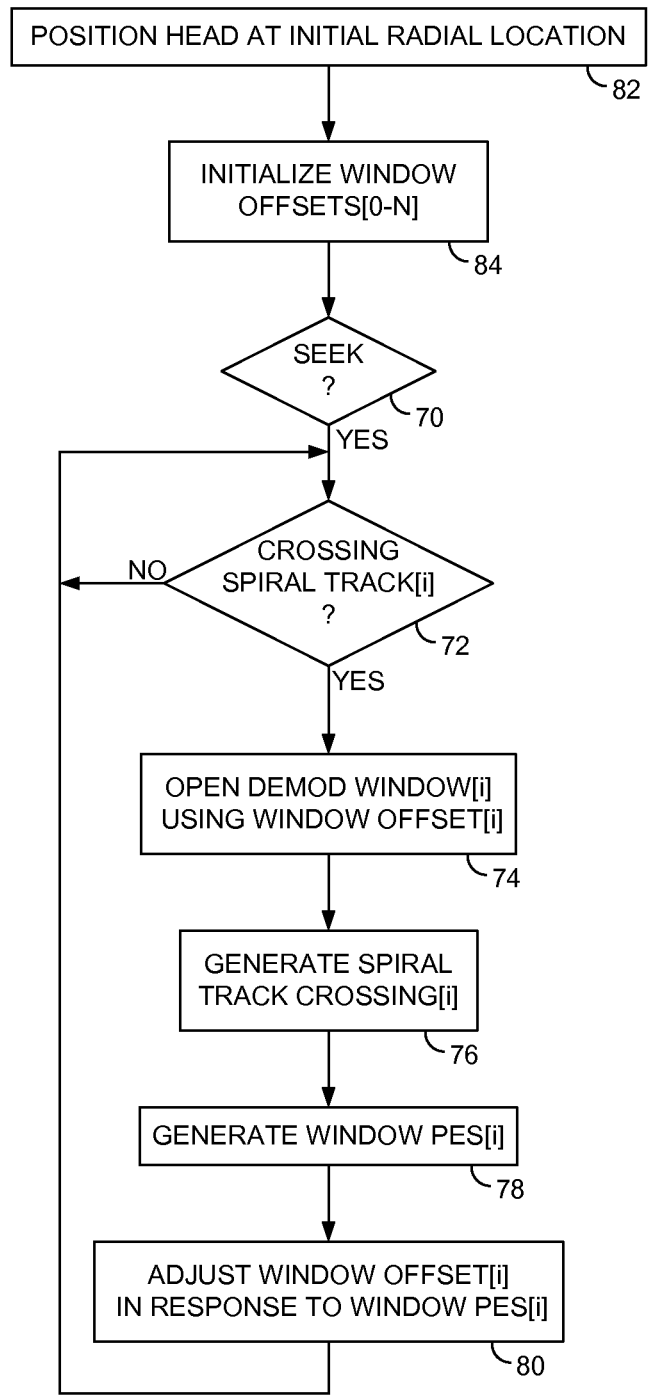
FIG. 9B is a flow diagram according to an embodiment of the present invention wherein the head is positioned at an initial radial location in order to initialize the window offsets.

FIG. 9B is a flow diagram according to an embodiment of the present invention for initializing the window offsets[0-N]. After loading the head over the disk surface, the head is positioned at an initial radial location (step 82) and the servo write clock is synchronized to at least the sync marks in the spiral track crossings as described above. In one embodiment, the head is maintained over the initial radial location by servoing off of the spiral tracks using any suitable algorithm for generating a spiral PES (e.g., as described above with reference to FIG. 8A). In another embodiment, the head may be maintained at the initial radial location by servoing off of a band of concentric servo tracks that may be prerecorded on the disk (e.g., when writing the spiral tracks) and interleaved with the spiral tracks. In one embodiment, the initial locations of the spiral tracks are unknown and therefore the demodulation windows are kept open so that the control circuitry continuously searches for the spiral track crossings.

Once the spiral track crossings have been located, each window offset[i] is initialized based on the initial location of the corresponding spiral track crossing[i]. In one embodiment, the window offsets may be initialized to zero after centering each demodulation window[i] about their respective spiral track crossing. In another embodiment, each window offset[i] may be initialized based on an average spiral PES generated for the spiral track crossings. For example, a window offset[i] may be initialized to zero if the spiral PES generated for the corresponding spiral track crossing[i] matches the average spiral PES, otherwise the window offset [i] may be initialized to a non-zero value corresponding to the difference between the average spiral PES and the actual spiral PES. In either case, the demodulation window is initially centered about the spiral track crossing (using the initial zero or non-zero window offset).

After initializing the window offsets, the demodulation windows are enabled so as to open when approaching a spiral track crossing. The window offset for each demodulation window is then updated during each revolution of the disk using the above described N servo loops $58_0$-$58_N$. In one embodiment, the N servo loops $58_0$-$58_N$ operate continuously, including during seeks, in order to track the deviations of the spiral track crossings from their expected locations as illustrated in FIG. 7A. That is, the window offsets are continuously updated so that the demodulation windows remain centered about each spiral track crossing, even while seeking the head radially over the disk surface.

In one embodiment, the ability of the N servo loops $58_0$-$58_N$ to adequately track the locations of the spiral track crossings during a seek depends on the seek velocity as well as the rate that the spiral tracks deviate from their expected locations. In other words, the ability to adequately compensate for the changing window PES depends on the bandwidth of the N servo loops $58_0$-$58_N$. In one embodiment, the rate of change in the window PES is controlled by adjusting the seek velocity. If the average window PES exceeds a first threshold, indicating that the window PES[i] is changing faster than the tracking ability of the corresponding servo loop[i], the seek velocity is decreased. Conversely, if the average window PES falls below a second threshold, the seek velocity is increased in order to improve performance.

Figure 9C:
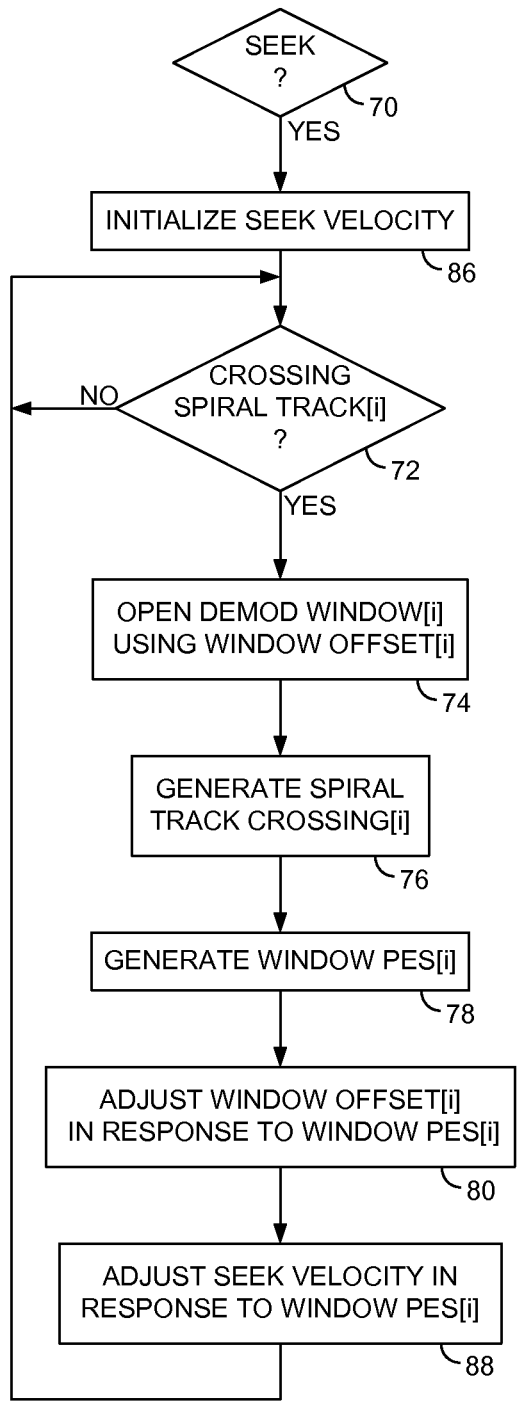
FIG. 9C is a flow diagram according to an embodiment of the present invention wherein a seek velocity is adjusted in response to the window PES during a seek operation.

The seek velocity may be adjusted in any suitable manner, wherein in the flow diagram of FIG. 9C the seek velocity is initialized at the beginning of a seek operation (step 86). The seek velocity is then adjusted during the seek operation in response to the window PES generated at each spiral track crossing (step 88). As described above, in one embodiment the window PES generated during each disk revolution for a corresponding spiral track crossing may be averaged, and the seek velocity adjusted in response to the average window PES. In one embodiment, the window PES generated for all of the spiral track crossings may be averaged into a composite window PES used to adjust the seek velocity. In yet another embodiment, the seek velocity may be adjusted based on the worst case window PES (or average window PES) out of the set of spiral track crossings. Adjusting the seek velocity based on the worst case window PES ensures that all of the demodulation windows are able to adequately track the deviations in the spiral track crossings during the seek operation.

Figure 9D:
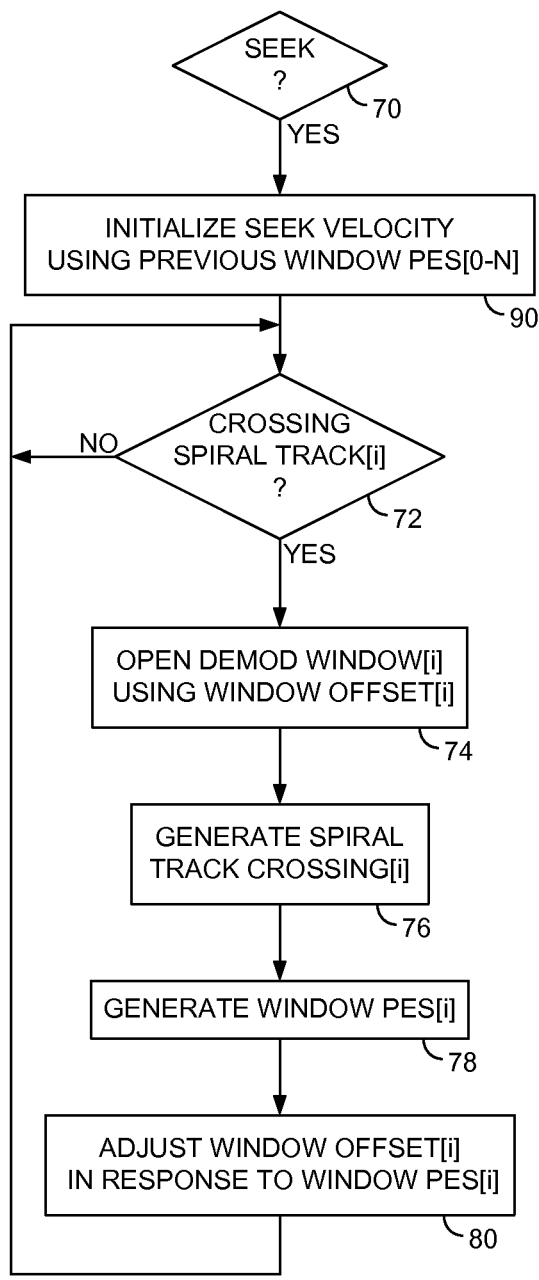
FIG. 9D is a flow diagram according to an embodiment of the present invention wherein a seek velocity is adjusted in response to the window PES after a seek operation.

FIG. 9D illustrates an alternative embodiment of the present invention wherein the seek velocity is initialized at the beginning of a seek operation based on the window PES of a previous seek operation (step 90). That is, during the previous seek operation the seek velocity remains constant, but the window PES is accumulated and used to adjust the seek velocity for a subsequent seek operation. This embodiment may simplify certain aspects of implementation by maintaining a constant seek velocity during each seek (e.g., it may simplify the computation of the expected location of the spiral tracks as the head moves radially over the disk surface).

In one embodiment, it may be desirable to seek the head radially over the disk surface using the spiral tracks after writing at least some of the product servo sectors 56 as illustrated in FIG. 5. For example, if the servo writing operation is aborted in the middle of the fill operation, it may be desirable to seek the head to the point where the servo writing was aborted in order to resume the fill operation. Alternatively, it may be desirable to seek the head using spiral tracks that comprise gaps corresponding to the locations where the product servo sectors will be written. In either case, at certain radial locations one or more of the spiral tracks will be unavailable (either overwritten by a product servo sector or gapped), and in one embodiment the adjustment to the corresponding window offset is disabled while the head is seeking over these radial locations. The adjustment to the window offset is then resumed once the head seeks radially past the overwritten or gapped spiral track.

Figure 10:
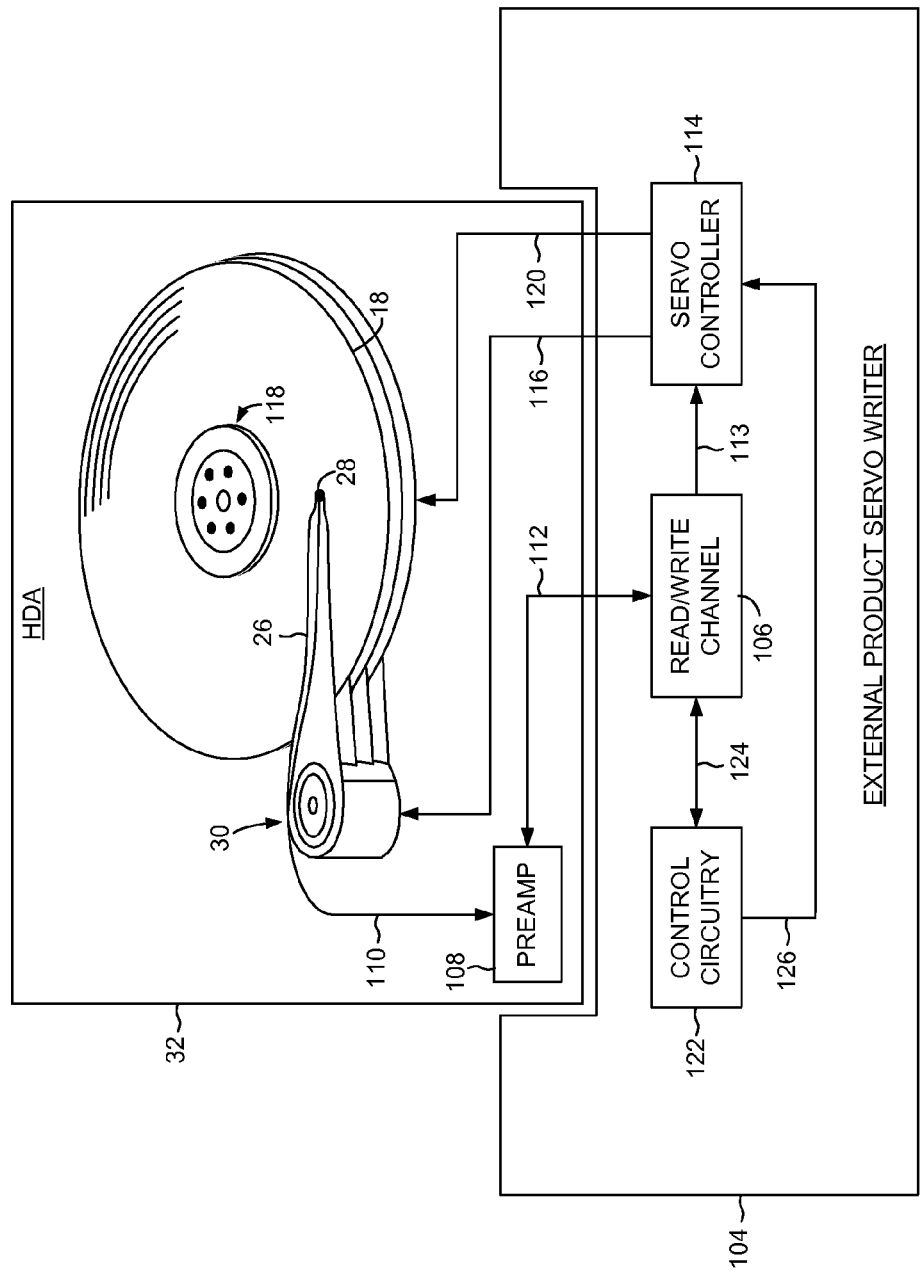
FIG. 10 illustrates an embodiment of the present invention wherein an external product servo writer is used to process the spiral tracks in order to write the product servo sectors to the disk.
Figure 11:
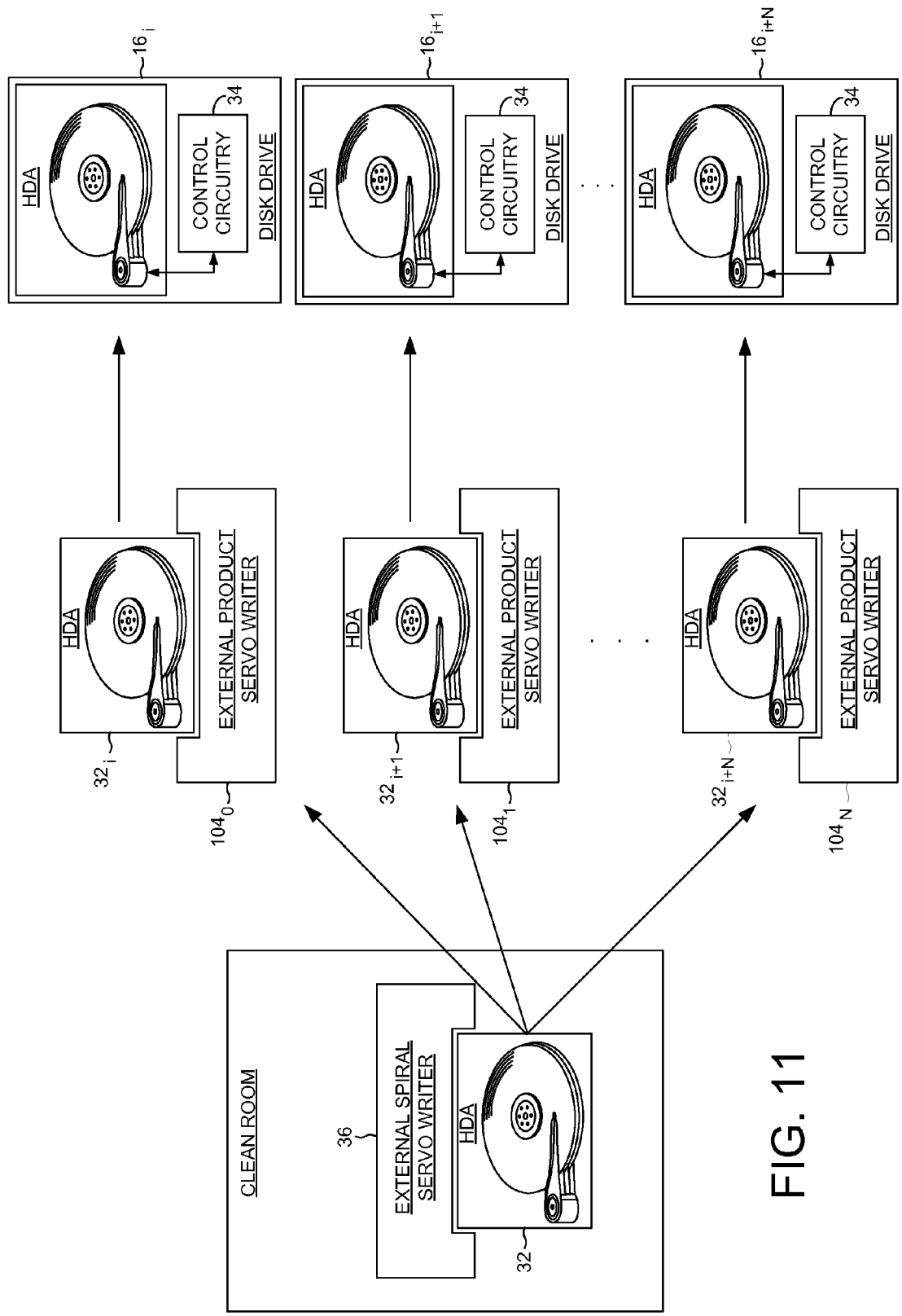
FIG. 11 illustrates an embodiment of the present invention wherein an external spiral servo writer is used to write the spiral tracks, and a plurality of external product servo writers write the product servo sectors for the HDAs output by the external spiral servo writer.

FIG. 10 shows an embodiment of the present invention wherein after writing the spiral tracks $20_0$-$20_N$ to the disk 18 (FIGS. 2A-2B), the HDA 32 is inserted into an external product servo writer 104 comprising suitable circuitry for reading and processing the spiral tracks $20_0$-$20_N$ in order to write the product servo sectors $56_0$-$56_N$ to the disk 18. The external product servo writer 104 comprises a read/write channel 106 for interfacing with a preamp 108 in the HDA 32. The preamp 108 amplifies a read signal emanating from the head 28 over line 110 to generate an amplified read signal applied to the read/write channel 106 over line 112. The read/write channel 106 comprises circuitry for generating servo burst signals 113 applied to a servo controller 114. The servo controller 114 processes the servo burst signals 113 to generate the PES. The PES is processed to generate a VCM control signal applied to the VCM 30 over line 116 in order to maintain the head 28 along a circular path while writing the product servo sectors $56_0$-$56_N$. The servo controller 114 also generates a spindle motor control signal applied to a spindle motor 118 over line 120 to maintain the disk 18 at a desired angular velocity. Control circuitry 122 processes information received from the read/write channel 106 over line 124 associated with the spiral tracks $20_0$-$20_N$ (e.g., timing information) and provides the product servo sector data to the read/write channel 106 at the appropriate time. The product servo sector data is provided to the preamp 108 which modulates a current in the head 28 in order to write the product servo sectors $56_0$-$56_N$ to the disk 18. The control circuitry 122 also transmits control information over line 126 to the servo controller 114 such as the target servo track to be written. After writing the product servo sectors $56_0$-$56_N$ to the disk 18, the HDA 32 is removed from the external product servo writer 104 and a printed circuit board assembly (PCBA) comprising the control circuitry 34 (FIG. 2A) is mounted to the HDA 32.

Figure 12:
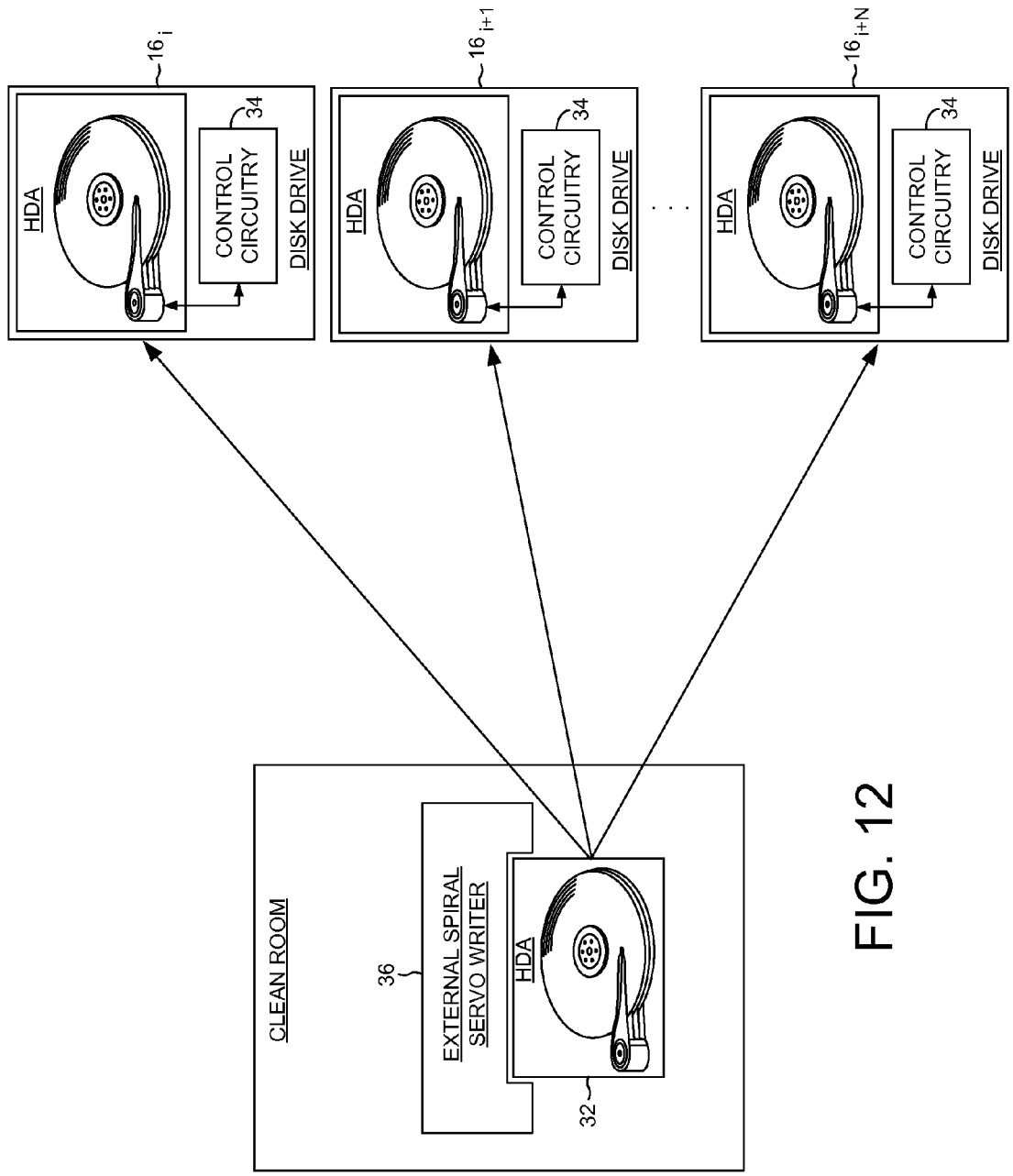
FIG. 12 illustrates an embodiment of the present invention wherein an external spiral servo writer is used to write the spiral tracks, and the control circuitry within each product disk drive is used to write the product servo sectors.

In one embodiment, the external product servo writer 104 of FIG. 10 interfaces with the HDA 32 over the same connections as the control circuitry 34 to minimize the modifications needed to facilitate the external product servo writer 104. The external product servo writer 104 is less expensive than a conventional servo writer because it does not require a clean room or sophisticated head positioning mechanics. In an embodiment shown in FIG. 11, a plurality of external product servo writers $104_0$-$104_N$ process the HDAs $32_{i\text{-}i+N}$ output by an external spiral servo writer 36 in order to write the product servo sectors less expensively and more efficiently than a conventional servo writer. In an alternative embodiment shown in FIG. 12, an external spiral servo writer 36 or an external media writer is used to write the spiral tracks, and the control circuitry 34 within each product disk drive $16_0$-$16_N$ is used to write the product servo sectors.

Any suitable control circuitry may be employed to implement the flow diagrams in the embodiments of the present invention, such as any suitable integrated circuit or circuits. In the embodiment wherein the product servo sectors are self-written by each disk drive, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk comprising a plurality of spiral tracks, each spiral track comprising a high frequency signal interrupted at a predetermined interval by a sync mark;
    a head actuated over the disk; and
    control circuitry operable to:
        use the head to read the spiral tracks to generate a read signal representing spiral track crossings; and
        process the spiral track crossings to first seek the head over a plurality of concentric tracks defined by the spiral tracks, and during the first seek:
            first open a first demodulation window in response to a first window offset during a first revolution of the disk, wherein the first demodulation window corresponds to the head approaching a first spiral track;
            use the head to read the first spiral track to generate a first spiral track crossing;
            generate a first window position error signal (PES) representing a difference between a target framing of the first demodulation window around the first spiral track crossing and a detected framing of the first demodulation window around the first spiral track crossing;
            adjust the first window offset in response to the first window PES; and
            second open the first demodulation window in response to the adjusted first window offset during a second revolution of the disk.

2. The disk drive as recited in claim 1, wherein the target framing corresponds to a center of the first spiral track crossing occurring at a center of the first demodulation window.

3. The disk drive as recited in claim 1, wherein the control circuitry is further operable to:
    position the head at an initial radial location over the disk; and
    initialize the first window offset prior to the first seek.

4. The disk drive as recited in claim 1, wherein the control circuitry is further operable to evaluate the first window PES to adjust a seek velocity.

5. The disk drive as recited in claim 4, wherein the control circuitry is further operable to adjust the seek velocity during the first seek.

6. The disk drive as recited in claim 4, wherein the control circuitry is further operable to adjust the seek velocity after the first seek and prior to a second seek.

7. The disk drive as recited in claim 1, wherein the control circuitry is further operable to:
    process the spiral track crossings to maintain the head in a substantial circular path while writing product servo sectors to the disk, including to write the product servo sectors over the first spiral track at a first radial location; and
    disable the adjustment to the first window offset during the first seek when the head is at the first radial location.

8. The disk drive as recited in claim 1, wherein during the first seek the control circuitry is further operable to:
    first open a second demodulation window in response a second window offset during the first revolution of the disk, wherein the second demodulation window corresponds to the head approaching a second spiral track;
    use the head to read the second spiral track to generate a second spiral track crossing;
    generate a second window PES representing a difference between a target framing of the second demodulation window around the second spiral track crossing and a detected framing of the second demodulation window around the second spiral track crossing;
    adjust the second window offset in response to the second window PES; and
    second open the second demodulation window in response to the adjusted second window offset during the second revolution of the disk.

9. A method of operating a disk drive, the disk drive comprising a head actuated over a disk comprising a plurality of spiral tracks, each spiral track comprising a high frequency signal interrupted at a predetermined interval by a sync mark, the method comprising:
    using the head to read the spiral tracks to generate a read signal representing spiral track crossings; and
    processing the spiral track crossings to first seek the head over a plurality of concentric tracks defined by the spiral tracks, and during the first seek:
        first opening a first demodulation window in response to a first window offset during a first revolution of the disk, wherein the first demodulation window corresponds to the head approaching a first spiral track;
        using the head to read the first spiral track to generate a first spiral track crossing;
        generating a first window position error signal (PES) representing a difference between a target framing of the first demodulation window around the first spiral track crossing and a detected framing of the first demodulation window around the first spiral track crossing;
        adjusting the first window offset in response to the first window PES; and
        second opening the first demodulation window in response to the adjusted first window offset during a second revolution of the disk.

10. The method as recited in claim 9, wherein the target framing corresponds to a center of the first spiral track crossing occurring at a center of the first demodulation window.

11. The method as recited in claim 9, further comprising:
    positioning the head at an initial radial location over the disk; and
    initializing the first window offset prior to the first seek.

12. The method as recited in claim 9, further comprising evaluating the first window PES to adjust a seek velocity.

13. The method as recited in claim 12, further comprising adjusting the seek velocity during the first seek.

14. The method as recited in claim 12, further comprising adjusting the seek velocity after the first seek and prior to a second seek.

15. The method as recited in claim 9, further comprising:
- processing the spiral track crossings to maintain the head in a substantial circular path while writing product servo sectors to the disk, including to write the product servo sectors over the first spiral track at a first radial location; and
- disabling the adjustment to the first window offset during the first seek when the head is at the first radial location.

16. The method as recited in claim 9, wherein during the first seek further comprising:
- first opening a second demodulation window in response a second window offset during the first revolution of the disk, wherein the second demodulation window corresponds to the head approaching a second spiral track;
- using the head to read the second spiral track to generate a second spiral track crossing;
- generating a second window PES representing a difference between a target framing of the second demodulation window around the second spiral track crossing and a detected framing of the second demodulation window around the second spiral track crossing;
- adjusting the second window offset in response to the second window PES; and
- second opening the second demodulation window in response to the adjusted second window offset during the second revolution of the disk.

\* \* \* \* \*